Oct. 30, 1951  J. A. HURRY  2,573,643
MOLD FOR MANUFACTURING AND CURING TRANSMISSION BELTS
Filed April 3, 1948
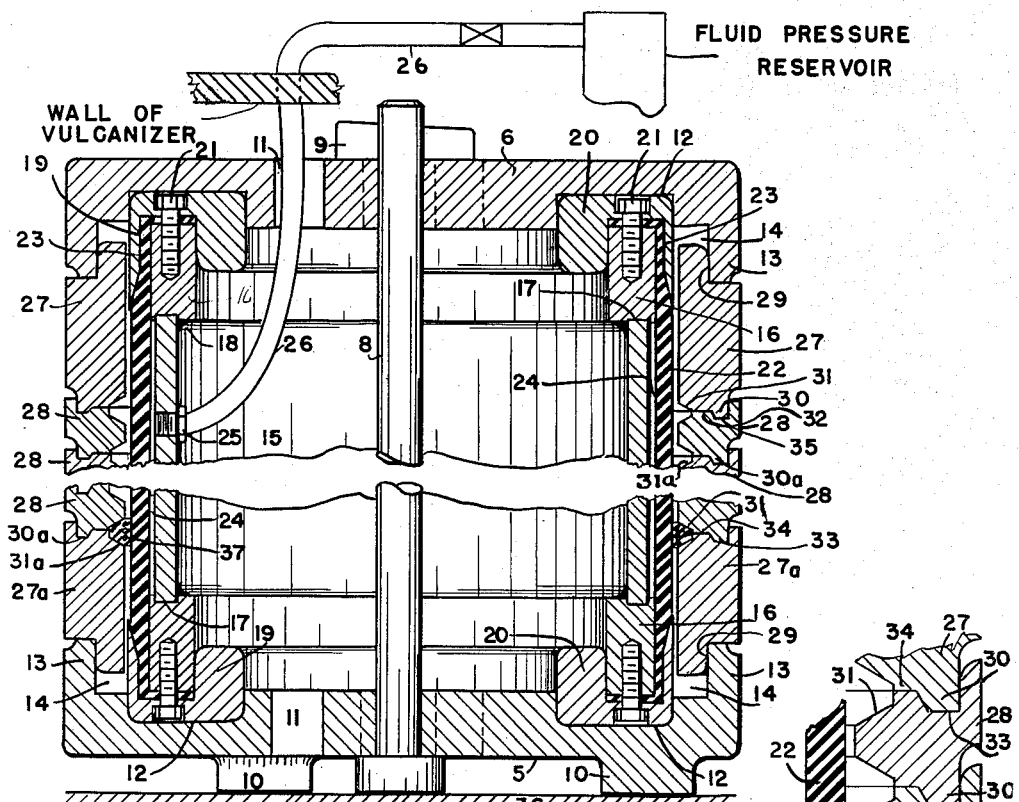
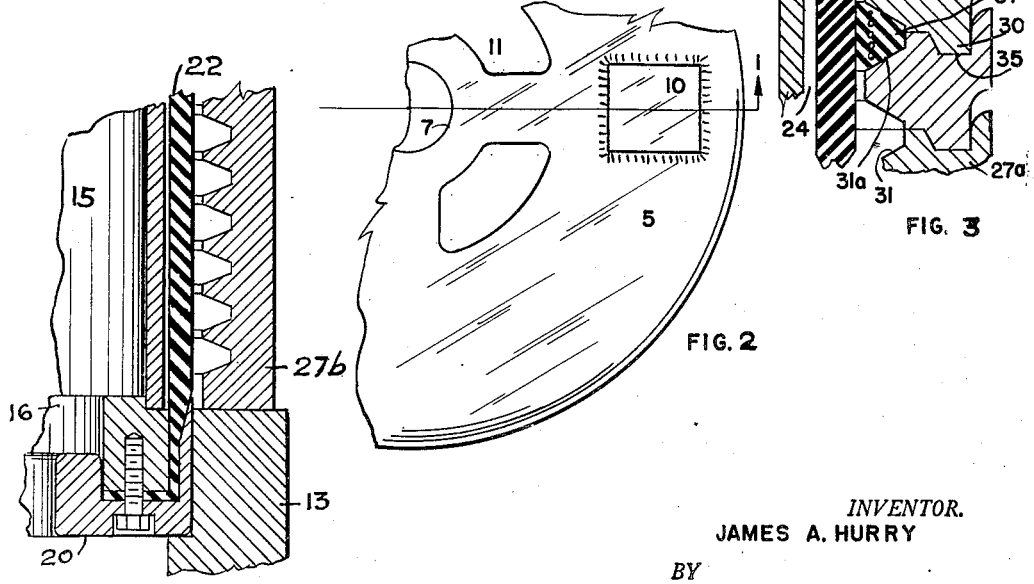
INVENTOR.
JAMES A. HURRY
BY
Martin & Anderson
ATTORNEY Patented Oct. 30, 1951

2,573,643

UNITED STATES PATENT OFFICE 2,573,643

MOLD FOR MANUFACTURING AND CURING TRANSMISSION BELTS

James A. Hurry, Denver, Colo., assignor to Gates Rubber Company, Denver, Colo., a corporation of Colorado Application April 3, 1948, Serial No. 18,824

5 Claims. (Cl. 18—6)

This invention relates to improvements in molds for manufacturing and curing power transmission belts.

The transmission of power between different machines is today effected quite generally by means of power transmission belts of the V-type which have been and are rapidly replacing gear and sprocket chain transmissions.

Belts of this type, especially such as are used between comparatively short centers are nearly always molded in endless form. There are in use today several methods of manufacturing belts of this general type, which, however, will not be described here.

Power transmission belts are practically all provided with an endless tension core usually formed from fabric cords such as cotton, rayon or nylon and which are also at times formed from stranded metal cables.

In the manufacture of power transmission belts of the type mentioned above, it is quite essential that the tension core shall be kept under a comparatively high tensional strain during the curing of the belt. This assures that the belt will not increase unduly in length after it has been put into operation.

In belts of the V-type, the tension layer is usually positioned much closer to the outside or wide surface of the belt than to the inner and narrow side, and the body of the belt between the tension layer and the narrow side is nearly always composed of material formed entirely or in part, by rubber composition. Where belts of this type are cured in the ordinary way, the tension layer is not subjected to any substantial amount of tensional strain during the curing operation with the result that the belt has a tendency to increase in length after it has been in use for some time.

It has been found that if belts of the V-type, cured with the wide surface towards the outside, are subjected to tension during the curing, such tension has a tendency to move the tension layer inwardly at opposed points in the belt, leaving the tension layer in an unsymmetrical condition.

In United States Patent No. 2,420,276, granted to Charles Walter Yelm on May 6, 1947, a method has been shown and described in which power transmission belts, and more particularly belts of the V-type, can be cured with the tension layer under a high degree of tensional strain without producing thereby an unsymmetrical construction. This method involves the idea of curing the belt with the wide surface innermost, or, as may be designated briefly, in inverted position.

In the manufacture of power transmission belts of the type to which this invention relates, it is desirable that the cords or cables forming the tension layer shall be under uniform strain throughout their entire length during the curing operation and this invention relates more particularly to a mold for making and curing belts of this type in such a manner that the tension layer will be maintained under uniform strain throughout its entire length during the curing operation.

This invention, briefly described, consists in curing V-type belts in an inverted position, that is, with the narrow side towards the outside, and subjecting the belt to an expanding force applied to its wider surface in such a manner as to force the belt outwardly into a groove mold and to maintain the tension layer under strain during the curing operation.

Having thus briefly described the objects of the invention and, in a general way, the method employed, the invention will now be described in detail and for this purpose reference will be had to the accompanying drawing in which:

Figure 1 is a diametrical section through a mold designed for use in carrying out this method, taken on line 1—1, Figure 2;

Figure 2 is a bottom plan view of the mold partly broken away;

Figure 3 is a fragmentary section, like that shown in Figure 1, shown to an enlarged scale; and Figure 4 is a section similar to that shown in Figure 3 showing a slightly modified mold element.

The method that has been briefly described above is carried out by means of a mold which will now be described and which consists of two end closure plates 5 and 6, which are preferably circular as shown in Figure 2. The end closure plates are formed from metal such as steel and are quite massive so as to resist heavy strains. The end closure plates are provided with central openings 7 for the reception of a bolt 8 that secures them in assembled position, one end of the bolt having an opening for the reception of the wedge 9. The two end closure plates are substantially identical, the only difference in those shown is that the bottom closure is provided with three or more downwardly extending lugs 10 that serve to space the same from the bottom of the vulcanizing kettle. Such lugs may also be present in the top end closure, if desired. The closure plates are also provided with a number of openings like those designated by reference numeral 11. Each closure plate is provided with an annular recess or groove, whose bottom has been designated by reference numeral 12 and with an upwardly extending flange 13, the diameter of whose inner wall is slightly greater than the outer diameter of the groove 12 so as to leave a rabbet 14. Positioned between the end closure plates is an assembly comprising a metal cylinder 15, preferably made from steel, to the ends of which are secured, by welding, rings 16. Rings 16 are provided in their ends with grooves 17 into which the ends of the cylinder 15 extend. The weld has been indicated by reference numeral 18. The outer diameters of rings 16 are somewhat greater than the outer diameter of cylinder 15 for a purpose which will hereinafter appear. Rings 16 are positioned in annular grooves or channels 19 in rings 20, the latter fitting into grooves 12, as shown in the drawing. Rings 20 are secured to rings 10 by means of bolts 21. A heavy rubber cylinder 22 surrounds the assembly comprising cylinder 15 and rings 16. The walls of cylinder 22 are somewhat reduced in thickness near their ends and project into the grooves in rings 20 and are positioned between the outer wall 23 of rings 20 and the outer surface of rings 16. The ends of cylinder 22 are then bent inwardly so as to lie between the ends of rings 16 and the bottom of groove 19 and are clamped in position by bolts 21. Since the outer diameter of ring 16 is slightly greater than the outside diameter of cylinder 15, a narrow space 24 is formed between the metal cylinder and the rubber cylinder. Metal cylinder 15 is provided with a hole 25 for the reception of one end of an air hose 26 which extends to a reservoir containing fluid under pressure. Between the flanges 13 of the end closures 5 and 6, there are positioned several rings. Those nearest the ends have been designated by reference numeral 27 and the intermediate rings by reference numeral 28. There may be as many of the intermediate rings as desired, but in the drawing only one ring 28 has been shown complete and the others have been shown in broken form.

It will be observed that rings 27 are provided near their ends with a rabbet 29, into which flanges 13 extend. The outer edge of the uppermost ring 27 is provided with a tongue 30 and has an inclined wall 31 that is connected with the tongue by means of a flat surface 32. The lowermost ring 27a is provided with an annular groove 33 instead of with a tongue 30 like that of the upper ring. The lowermost ring 27a is provided with an inclined wall 31 connected with the groove 33 by means of a flat surface 34. Rings 28 are of the shape shown in the drawing and are provided on their upper surfaces with grooves 35 for the reception of the tongues 30 and 30a, their inner surfaces having inclined walls 31a that cooperate with walls 32 to form a groove of the size and shape of the belt to be cured therein.

The belts to be cured in this form are first built up in the usual manner and cut to substantially the size and shape desired. The form shown in the drawing is positioned on a supporting surface like that one designated by reference numeral 36 and the lowermost ring 27a rests on the bottom end closure. A belt is then positioned against the inclined surface 31 of ring 27a. This belt has been indicated by cross hatching and designated by reference numeral 37. A ring 28 is now positioned on the upper edge of the lowermost ring 27a and another belt is positioned against the inclined surface 31. This is continued until all of the grooves are filled, after which the upper ring 27 is put into position and the form is closed by adding end closure 6, after which wedge 9 is driven into the opening in bolt 8 so as to hold the parts in assembled position. Fluid under pressure, either air, steam or water, is now supplied to space 24 from a suitable source. The pressure thus introduced will force the belts outwardly against the inclined walls of the mold and because cylinder 22 is made of elastic material and forced outwardly by fluid pressure, it will exert equal radial forces along all points. Increasing the diameter of the belt by means of this uniform radial pressure, subjects the tension cords to a uniform tensional strain. The assembly is now positioned in a vulcanizing kettle and subjected to heat provided by steam of the proper temperature. The steam not only surrounds the outside of the form, but also fills the interior because the end closures are provided with openings 11, as already poined out. The pressure supplied to chamber 24 must be greater than the pressure of the steam employed in the curing because the effective pressure is the difference between the pressure of the expanding fluid and that of the steam used for heating.

After the belts have been cured, the mold is removed from the vulcanizing kettle and opened; the belts are then removed and the mold filled with uncured belts and the operation repeated.

In Figures 1 and 3 the mold has been shown as formed from a plurality of rings 27 and 27a in the manner in which such molds are formed for curing belts in the ordinary way. Since this mold is designed to cure belts in inverted position and has the belt cavities or grooves on the inside, the grooved element, instead of being formed from a plurality of rings, can be made of a single cylinder like that shown in Figure 4 and designated by 27b.

Attention is again directed to the very important feature, namely, that by the above described means the tension layers in the belts are stretched uniformly along their entire lengths, thereby assuring that the belt will have the same characteristics at all transverse sections and assuring further, that the belt will substantially retain its original length when put into use.

In the drawing the mold has been shown as designed for the curing of belts of the V-type. It is to be understood that belts of any other cross sectional shape may be cured in the same way.

Attention is called to the fact that in this mold and with this method the belts are cured with their narrow wall towards the outside. Such belts must be reversed for use with V-type pulleys producing thereby belts having some physical characteristics not found in belts of the V-type cured with the narrow side inside.

The material of the body of the belt is usually rubber composition such as ordinarily employed, but may be made of any one of the so-called synthetic rubbers, plastics or fabrics. The tension layer is usually formed from cotton cords, but may be of rayon or nylon or any other suitable material.

This application is a continuation in part of applicant's pending application Serial No. 765,738, filed August 2, 1947.

Having described the invention what is claimed as new is:

1. A mold for use in curing power transmission belts, comprising a base, a tubular cylindrical mold section supported on the base, the inner surface of said cylinder having a plurality of longitudinally spaced, endless belt grooves of the desired belt cross section, for the reception of uncured belts, and means for exerting a uniform outwardly directed radial pressure on the inner surfaces of belts positioned in the grooves, said means comprising a metal cylinder, a cylinder of resilient expansible material encircling the metal cylinder, and means for effecting an airtight seal between the ends of the cylinders, whereby an annular chamber is formed for the reception of a fluid under pressure, for expanding the outer cylinder.

2. A mold for curing raw power transmission belts, comprising, an elongated tubular cylinder having its inner surface provided with a plurality of longitudinally spaced endless grooves of the desired belt cross section, and an expansible element positioned in the cylinder, said element comprising a metal cylinder of greater length than the grooved inner surface of the outer cylinder, a rubber cylinder enclosing the second mentioned cylinder, and means for effecting an airtight seal between the ends of the rubber cylinder and the metal cylinder it surrounds, thereby forming an annular chamber for the reception of a fluid under pressure for expanding the rubber cylinder into engagement with the grooved inner surface of the first mentioned cylinder.

3. A mold for simultaneously curing a plurality of endless power transmission belts under compressive and tensional strains, comprising, in combination, a hollow cylinder having its inner surface provided with a plurality of spaced endless grooves of the desired belt cross section, adapted to receive and hold uncured power transmission belts, and means positioned within the grooved cylinder for applying a uniformly distributed radial force to the inner surface of the cylinder, said means comprising a tubular metal cylinder, a tubular cylinder of rubber-like material enclosing the metal cylinder, means for effecting a gas tight seal between the ends of the metal and the rubber cylinder, the latter being expansible, and means for introducing a fluid under pressure to the space between the rubber and the metal cylinders, whereby the rubber cylinder will increase in diameter, the normal outside diameter of the rubber cylinder being slightly less than the inside diameter of the grooved cylinder.

4. A mold for simultaneously curing a plurality of endless power transmission belts under longitudinal tensional and transverse compressive strains acting uniformly along the entire length of the belt, comprising, in combination, a cylinder having at least one end open, the inner surface of the cylinder having a plurality of endless grooves forming belt cavities of the desired belt cross section, a compression device positioned in the cylinder, comprising a rigid metal cylinder, a cylinder of flexible, resiliently extensible material surrounding the second mentioned cylinder, the ends of the flexible cylinder being hermetically sealed to the second mentioned cylinder, whereby, when a fluid is introduced into the space between the outer surface of the said second mentioned cylinder and the inner surface of the flexible cylinder, the latter will increase in diameter, the normal outside diameter of the compression device being slightly less than the inside diameter of the grooved cylinder, whereby belts of uncured vulcanizable material positioned in the grooves will be subjected to a uniformly distributed radially acting force and maintained under transverse compressive and longitudinal tensional strains during the heat treatment.

5. A mold for use in curing power transmission belts, comprising, in combination, a base, a plurality of rings positioned on the base, in concentric superposed relation forming a cylinder, the inner edges of adjacent rings being cut away to form inwardly flaring grooves of the desired belt cross section, cooperating means on adjacent surfaces of adjacent rings for holding them in concentric relation, a cover supported on the uppermost ring, means interconnecting the base and the cover and for holding the ring assembly under pressure, and an expansible cylinder positioned within the cylindrical ring assembly, said expansible cylinder being normally of less diameter than the inside of the ring assembly and expansible into contact therewith when subjected to internal pressure, whereby uncured power transmission belts positioned in the grooves may be subjected to an outwardly acting radial force uniformly distributed throughout its length and maintained under longitudinal tensional and transverse compressive strains during heat curing treatment.

JAMES A. HURRY.

REFERENCES CITED

The following references are of record in the file of this patent:

UNITED STATES PATENTS

| Number | Name | Date |
|---|---|---|
| 270,342 | Sargent | Jan. 9, 1883 |
| 350,654 | Benjamin | Oct. 12, 1886 |
| 890,409 | Cox | June 9, 1908 |
| 1,432,973 | Delzell | Oct. 24, 1922 |
| 2,253,792 | Leavenworth | Aug. 26, 1941 |
| 2,292,290 | Robins | Aug. 4, 1942 |
| 2,324,991 | Groncy | July 20, 1943 |
| 2,363,107 | Young | Nov. 21, 1944 |
| 2,415,504 | MacDonald | Feb. 11, 1947 |
| 2,420,278 | Yelm | May 6, 1947 |